United States Patent
Zhu et al.

(10) Patent No.: US 10,374,771 B2
(45) Date of Patent: *Aug. 6, 2019

(54) SYSTEM AND METHOD FOR USING SEMI-ORTHOGONAL MULTIPLE ACCESS IN WIRELESS LOCAL AREA NETWORKS

(71) Applicant: Huawei Technologies Co., Ltd., Shenzhen (CN)

(72) Inventors: Jun Zhu, Shanghai (CN); Osama Aboul-Magd, Kanata (CA); Jung Hoon Suh, Kanata (CA); Meilu Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,048

(22) Filed: Mar. 9, 2017

(65) Prior Publication Data

US 2017/0180097 A1  Jun. 22, 2017

Related U.S. Application Data

(63) Continuation of application No. 14/974,998, filed on Dec. 18, 2015, now Pat. No. 9,614,711.
(Continued)

(51) Int. Cl.
*H04W 72/04* (2009.01)
*H04L 5/00* (2006.01)
(Continued)

(52) U.S. Cl.
CPC ............ *H04L 5/0053* (2013.01); *H04L 1/001* (2013.01); *H04L 1/0004* (2013.01);
(Continued)

(58) Field of Classification Search
CPC ..... H04L 5/0053; H04L 1/0004; H04L 1/001; H04L 27/34; H04L 27/3405; H04W 84/12;
(Continued)

(56) References Cited

U.S. PATENT DOCUMENTS 8,116,412 B1  2/2012  Jia et al.
8,290,077 B1  10/2012  Ben-Eli et al.
(Continued)

FOREIGN PATENT DOCUMENTS

CN  101171818 A  4/2008
CN  101179356 A  5/2008
(Continued)

OTHER PUBLICATIONS

"IEEE Standard for Information technology—Telecommunications and information exchange between systems Local and metropolitan area networks—Specific; Part 11: Wireless LAN Medium Access Control (MAC) and Phyiscal Layer (PHY) Specifications; Amendment 4: Enhancements for Very High Throughput for Operation in Bands below 6 GHz," IEEE Std 802.11ac—2013, Dec. 11, 2013, 395 pages.
(Continued)

*Primary Examiner* — Syed Haider
(74) *Attorney, Agent, or Firm* — Slater Matsil, LLP

(57) ABSTRACT

A method for operating a transmitting device using semi-orthogonal multiple access (SOMA) in a wireless local area network (WLAN) includes determining a first quadrature amplitude modulation (QAM) bit allocation, a first coding rate, and a first SOMA group for a first receiving device and a second QAM bit allocation, a second coding rate, and a second SOMA group for a second receiving device in accordance with channel information associated with the first receiving device and the second receiving device,
(Continued)

generating a frame including indicators of the first and second QAM bit allocations, the first and second coding rates, and the first and second SOMA groups, and sending the frame to the first receiving device and the second receiving device.

20 Claims, 15 Drawing Sheets

Related U.S. Application Data

(60) Provisional application No. 62/102,250, filed on Jan. 12, 2015.

(51) Int. Cl.
*H04L 27/34* (2006.01)
*H04L 1/00* (2006.01)
*H04W 52/26* (2009.01)
*H04W 84/12* (2009.01)

(52) U.S. Cl.
CPC ........ *H04L 5/0091* (2013.01); *H04L 27/3405* (2013.01); *H04W 52/262* (2013.01); *H04W 72/0446* (2013.01); *H04W 72/0473* (2013.01); *H04W 84/12* (2013.01)

(58) Field of Classification Search
CPC ........... H04W 52/262; H04W 72/0446; H04W 72/0473
See application file for complete search history.

(56) References Cited

U.S. PATENT DOCUMENTS

| | | | | |
|---|---|---|---|---|
| 2003/0128769 A1* | 7/2003 | Kim | ............... | H04L 1/0048 375/265 |
| 2003/0156659 A1* | 8/2003 | Hanaoka | ............... | H04L 1/0003 375/298 |
| 2005/0157670 A1* | 7/2005 | Tang | ............... | H04B 7/2628 370/320 |
| 2006/0269005 A1 | 11/2006 | Laroia et al. | | |
| 2007/0105595 A1* | 5/2007 | Prasad | ............... | H04B 7/0697 455/562.1 |
| 2010/0040171 A1 | 2/2010 | Qu et al. | | |
| 2010/0041406 A1 | 2/2010 | Kim et al. | | |
| 2010/0316024 A1 | 12/2010 | Kiran et al. | | |
| 2012/0106410 A1* | 5/2012 | Jia | ............... | H03C 3/00 370/297 |
| 2012/0218982 A1 | 8/2012 | Lee et al. | | |
| 2013/0159458 A1 | 6/2013 | Yu et al. | | |
| 2014/0010177 A1 | 1/2014 | Wentink | | |
| 2014/0177488 A1 | 6/2014 | Yang et al. | | |
| 2014/0247838 A1* | 9/2014 | Seok | ............... | H04L 5/0091 370/476 |
| 2014/0369276 A1* | 12/2014 | Porat | ............... | H04L 5/003 370/329 |
| 2015/0171983 A1 | 6/2015 | Kusashima | | |
| 2015/0327217 A1 | 11/2015 | Aboul-Magd et al. | | |
| 2016/0065401 A1 | 3/2016 | Jia et al. | | |

FOREIGN PATENT DOCUMENTS

| | | |
|---|---|---|
| CN | 102394727 A | 3/2012 |
| EP | 2858281 A1 | 4/2015 |
| JP | 2008533818 A | 8/2008 |
| JP | 2011530938 A | 12/2011 |
| JP | 2013247513 A | 12/2013 |
| KR | 20120117845 A | 10/2012 |
| WO | 2006096678 A1 | 9/2006 |
| WO | 2013002590 A2 | 1/2013 |
| WO | 2013176042 A1 | 11/2013 |

OTHER PUBLICATIONS

Jin, H., et al., "Bit Division Multiplexing for Broadcasting," IEEE Transactions on Broadcasting, Brief Papers, vol. 59, No. 3, Sep. 2013, pp. 539-547.

Saito, Y., et al., "Non-Orthogonal Multiple Access (NOMA) for Cellular Future Radio Access," Vehicular Technology Conference (VTC Spring), Jun. 2-5, 2013, pp. 1-5.

Huawei, Hisilicon, "Motivation for a study on enhancements for multiuser transmission in R13", 3GPP TSG RAN Meeting #66, RP-141917, Dec. 8-11, 2014, Maui, USA, 10 pages.

* cited by examiner

SYSTEM AND METHOD FOR USING SEMI-ORTHOGONAL MULTIPLE ACCESS IN WIRELESS LOCAL AREA NETWORKS

CROSS-REFERENCE TO RELATED APPLICATIONS

This application is a continuation of U.S. patent application Ser. No. 14/974,998, filed Dec. 18, 2015, entitled "System and Method for Using Semi-Orthogonal Multiple Access in Wireless local Area Networks," which claims the benefit of U.S. Provisional Application No. 62/102,250, filed on Jan. 12, 2015, entitled "System and Method for Using Semi-Orthogonal Multiple Access in WLAN," all of which applications are hereby incorporated herein by reference.

TECHNICAL FIELD

The present disclosure relates generally to digital communications, and more particularly to a system and method for using semi-orthogonal multiple access (SOMA) in wireless local area networks (WLAN).

BACKGROUND

A common goal of successive generation of radio frequency communications systems is to increase the amount of information transmitted in a given communications band. As an example, NTT Docomo has proposed non-orthogonal multiple access (NOMA) as a candidate for a Fifth Generation (5G) radio access technology. NOMA combines power optimization on a per user equipment (UE) basis and superposition coding. A detailed description of NOMA is provided in document Saito, et al, "Non-Orthogonal Multiple Access (NOMA) for Cellular Future Radio Access," VTC'13, June 2013, which is hereby incorporated herein by reference.

SUMMARY

Example embodiments provide a system and method for using semi-orthogonal multiple access (SOMA) in wireless local area networks (WLAN).

In accordance with an example embodiment, a method for operating a transmitting device using semi-orthogonal multiple access (SOMA) in a wireless local area network (WLAN) is provided. The method includes determining, by the transmitting device, a first quadrature amplitude modulation (QAM) bit allocation, a first coding rate, and a first SOMA group for a first receiving device and a second QAM bit allocation, a second coding rate, and a second SOMA group for a second receiving device in accordance with channel information associated with the first receiving device and the second receiving device, generating, by the transmitting device, a frame including indicators of the first and second QAM bit allocations, the first and second coding rates, and the first and second SOMA groups, and sending, by the transmitting device, the frame to the first receiving device and the second receiving device.

In accordance with another example embodiment, a method for operating a first receiving device operating in a semi-orthogonal multiple access (SOMA) wireless local area network (WLAN) is provided. The method includes determining, by the first receiving device, a first quadrature amplitude modulation (QAM) bit allocations, a first coding rate, and a first SOMA group for the first receiving device and a second QAM bit allocation, a second coding rate, and a second SOMA group for a second receiving device in accordance with a frame, receiving, by the first receiving device, a QAM symbol, demapping, by the first receiving device, the QAM symbol in accordance with the first and second QAM bit allocations, thereby producing encoded data, decoding, by the first receiving device, the encoded data in accordance with the first and second coding rates, thereby producing decoded data, and processing, by the first receiving device, the decoded data.

In accordance with another example embodiment, a transmitting device is provided. The transmitting device includes a processor, and a computer readable storage medium storing programming for execution by the processor. The programming including instructions to configure the transmitting device to determine a first quadrature amplitude modulation (QAM) bit allocation, a first coding rate, and a first SOMA group for a first receiving device and a second QAM bit allocation, a second coding rate, and a second SOMA group for a second receiving device in accordance with channel information associated with the first receiving device and the second receiving device, generate a frame including indicators of the first and second QAM bit allocations, the first and second coding rates, and the first and second SOMA groups, and send the frame to the first receiving device and the second receiving device.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to using SOMA in a WLAN. For example, a transmitting device determines quadrature amplitude modulation (QAM) allocations, coding rates, and SOMA groups for a first receiving device and a second receiving device in accordance with channel information associated with the first receiving device and the second receiving device, generates a frame including indicators of the QAM allocations, the coding rates, and the SOMA groups, and sends the frame to the first receiving device and the second receiving device.

The embodiments will be described with respect to example embodiments in a specific context, namely WLAN communications systems that use SOMA to improve communications performance. The embodiments may be applied to standards compliant WLAN communications systems, such as those that are compliant with IEEE 802.11, and the like, technical standards, and non-standards compliant communications systems, that use SOMA to improve communications performance.

Figure 1:
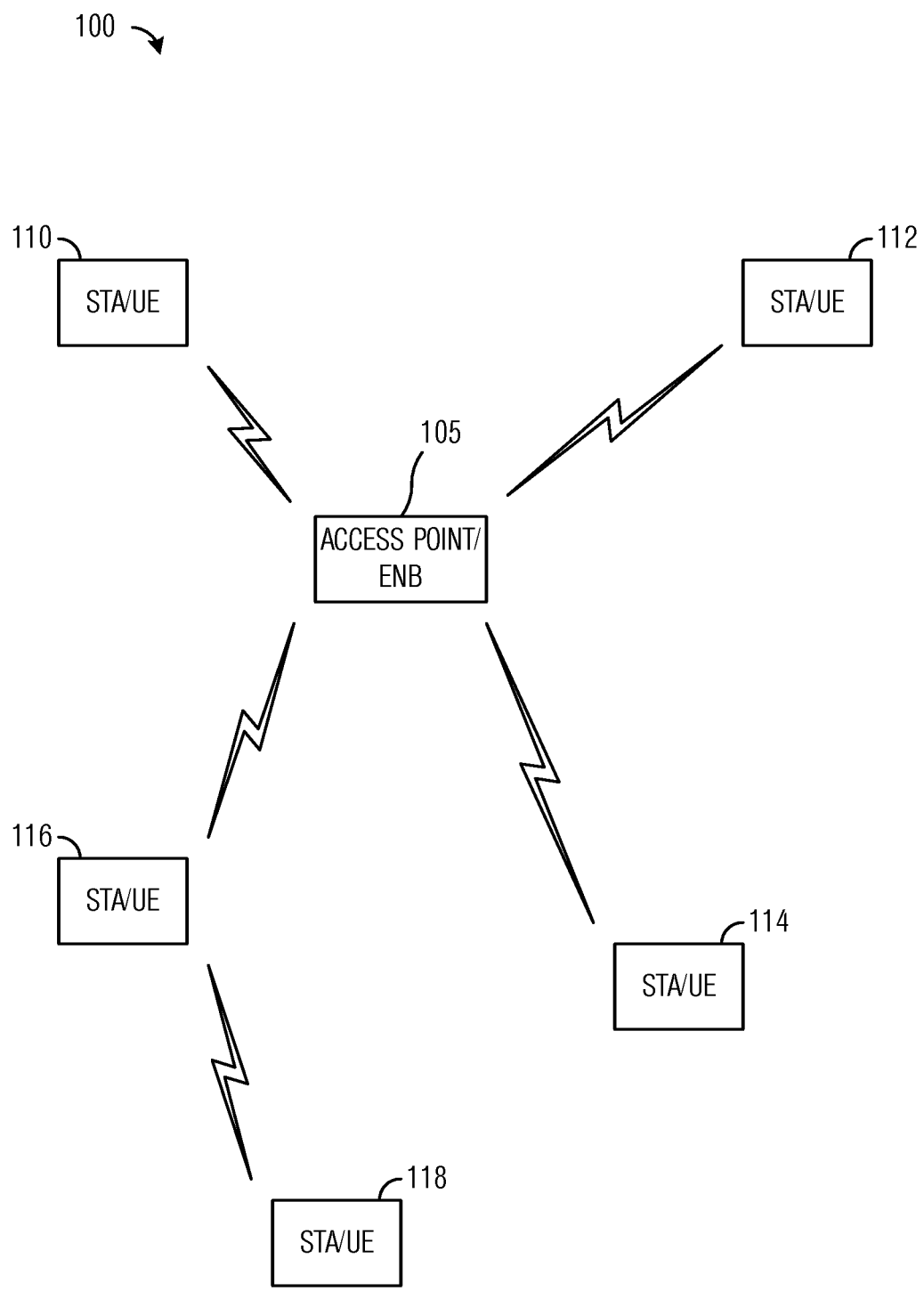
FIG. 1 illustrates an example communications system according to example embodiments described herein.

FIG. 1 illustrates an example communications system 100. Communications system 100 includes an access point (AP) 105 that may serve a plurality of stations (STA), such as STA 110, STA 112, STA 114, STA 116, and STA 118. AP 105 may schedule transmission opportunities for the STAs and signal information regarding the transmission opportunities to the STAs. Based on the type of the transmission opportunity, the STAs may receive transmissions or make transmissions in accordance with the scheduled transmission opportunities. AP 105, as well as a subset of the STAs, may implement example embodiments presented herein, namely, power and modulation domain multiple access, also known as semi-orthogonal multiple access (SOMA).

In general, APs may also be referred to as base stations, evolved NodeBs (eNBs), NodeBs, controllers, base terminal stations, and the like. Similarly, STAs may also be referred to as mobile stations, mobiles, terminals, users, subscribers, user equipments (UEs), and the like. While it is understood that communications systems may employ multiple APs capable of communicating with a number of STAs, only one AP, and a number of STAs are illustrated for simplicity.

Figure 2A:
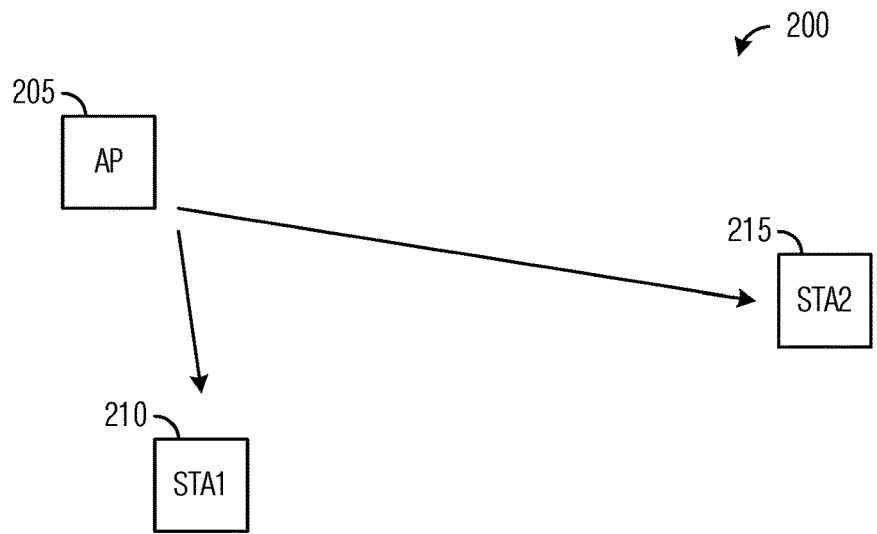
FIG. 2A illustrates an example communications system highlighting an arrangement of STAs according to example embodiments described herein.

FIG. 2A illustrates an example communications system 200 highlighting an arrangement of STAs. Communications system 200 includes an AP 205 serving a plurality of STAs, including STA1 210 and STA2 215. The STAs may also be referred to as receiving devices. STA1 210 may be located in close proximity to AP 205 and may have a high signal to noise ratio (SNR), e.g., 20 dB, while STA2 215 may be remotely located with respect to AP 205 and may have a low SNR, e.g., values greater than 5 dB, such as 8 dB. It is noted that proximity, i.e., separation, between AP and STA is not the only factor in channel quality (low SNR vs high SNR). Although the discussion presented herein focuses on 2 STAs (the high SNR STA and the low SNR STA), the example embodiments presented herein are operable with any number of STAs greater than 1.

Figure 2B:
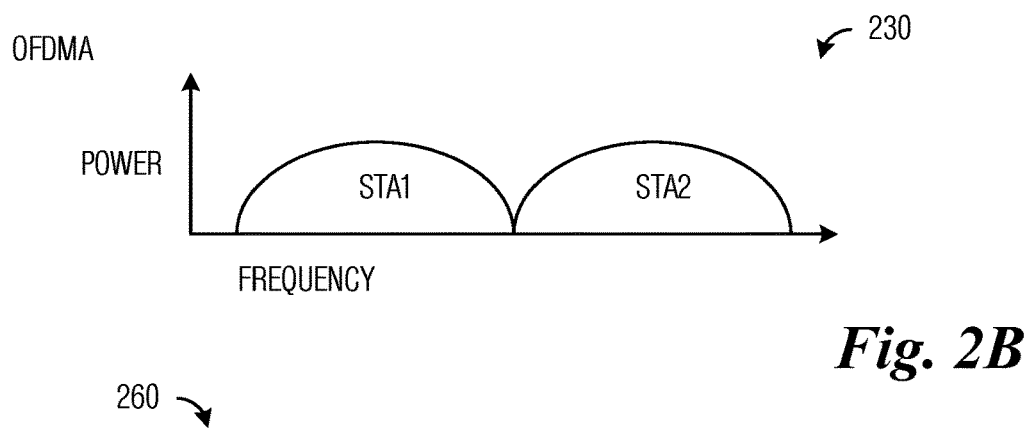
FIG. 2B illustrates an example bandwidth and data rate allocation for the communications system shown in FIG. 2A in an orthogonal frequency division multiple access (OFDMA) communications system according to example embodiments described herein.

FIG. 2B illustrates an example bandwidth and data rate allocation 230 for communications system 200 in an orthogonal frequency division multiple access (OFDMA) communications system. As shown in FIG. 2B, both STA1 210 and STA2 215 may be assigned approximately ½ of the bandwidth. However, since the communications channel for STA1 210 is of significantly better quality, the data rate for STA1 210 is significantly higher than the data rate for STA2 215 (3.33 bps/HZ compared to 0.50 bps/HZ, for example).

Figure 2C:
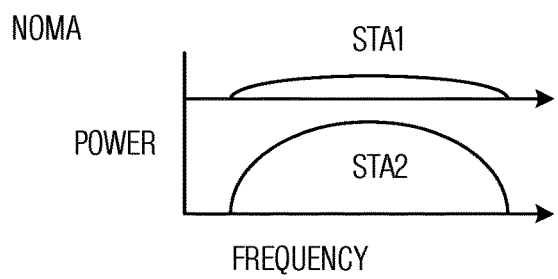
FIG. 2C illustrates an example bandwidth and data rate allocation for the communications system shown in FIG. 2A in a NOMA communications system according to example embodiments described herein.

FIG. 2C illustrates an example bandwidth and data rate allocation 260 for communications system 200 in a NOMA communications system. In NOMA, both STAs are allocated the same bandwidth but with different power levels. As shown in FIG. 2C, STA1 210 is assigned ⅕ of the available transmit power and STA2 215 is assigned ⅘ of the available transmit power. The data rate for STA1 210 is 4.39 bps/HZ and the data rate for STA2 215 is 0.74 bps/HZ, for example, both of which are higher than in the OFDMA communications system illustrated in FIG. 2B. NOMA may also utilize different time resources for different STAs, with a first slot being assigned to STA1 and a second slot being assigned to STA2, for example.

In NOMA, the decoding of the signal for STA1 210 involves STA1 210 receiving a signal that includes both a signal intended for STA1 210 and a signal intended for STA2 215, decoding of the signal intended for STA2 215, which may then be used to cancel interference due to the signal for STA2 215 from the received signal, and then decoding the interference cancelled signal to obtain the information intended for STA1 210. Therefore, STA1 210 needs to have knowledge of the modulation and coding set (MCS) assigned to STA2 215 in order to decode the signal intended for STA2 215. Success in decoding the signal intended for STA1 210 is dependent on the ability to decode the signal intended for STA2 215.

On the other hand, the decoding of the signal for STA2 215 involves STA2 215 receiving a signal that includes both a signal intended for STA1 210 and a signal intended for STA2 215, and decoding the received signal as the signal intended for STA2 215 while treating the signal intended for STA1 210 as noise. Since the signal intended for STA1 210 typically is not White Gaussian Noise to STA2 215, degradation in decoding performance may be observed.

As shown above, power domain optimization helps to improve the capacity of communications channels between an AP and two or more STAs. Power domain optimization may make use of channel condition, such as channel quality indicators (CQI), channel state information (CSI), and the like, reported by the STAs.

In Modulation Domain Multiple Access (MDMA), hierarchical modulation is used to simultaneously transmit information on different modulation layers. Each of the different modulation layers may be assigned to a different STA or multiple modulation layers may be assigned to a single STA. Different Gray code distances may be assigned to different modulation layers, thereby providing different levels of protection or reliability for different modulation layers. As an illustrative example, a modulation layer with small reliability may be assigned to a STA with high SNR since higher data rates may be achieved with high probability of successful decoding, while a modulation layer with large reliability may be assigned to a STA with low SNR since successful decoding is preferred over high data rate. MDMA is described in detail in U.S. Pat. No. 8,325,857, issued Dec. 4, 2012, which is hereby incorporated herein by reference.

Figure 3A:
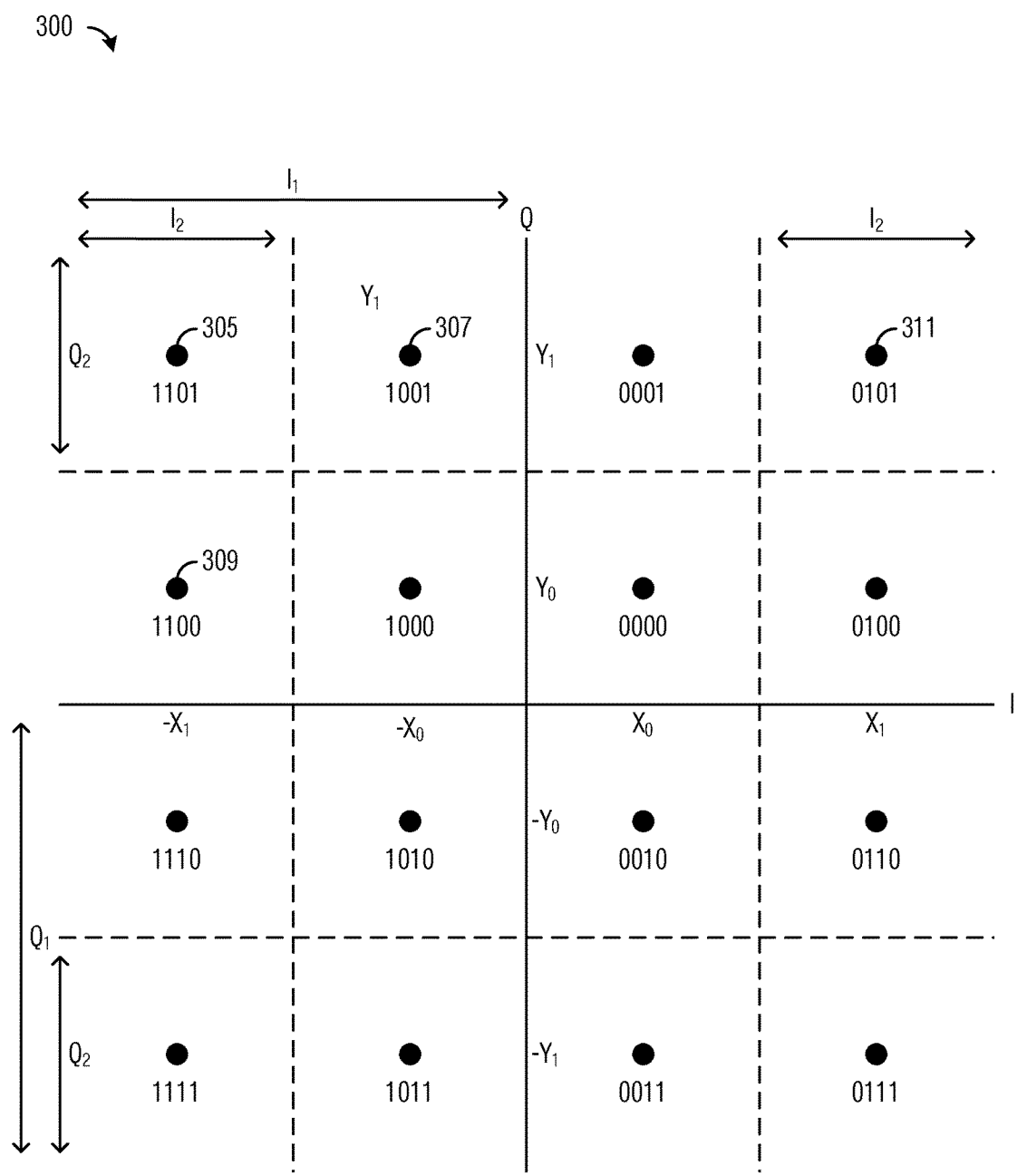
FIG. 3A illustrates a 16 QAM constellation.

In a quadrature amplitude modulation (QAM) constellation, some bits are more reliable than others. FIG. 3A illustrates a 16 QAM constellation 300. Each constellation point in 16 QAM constellation 300 represents 4 bits, e.g., $i_1 i_2 q_1 q_2$, where the i bits are the in-phase components (the i-axis) and the q bits are the quadrature-phase components (the q-axis). When the constellation points are mapped using a Gray code, for example constellation point 305 represents 1101, constellation point 307 represents low, constellation point 309 represents 1100, and constellation point 311 represents 0101, adjacent constellation points differ by a single bit. As an illustrative example, constellation points 305 and 307 differ at bit $i_2$, while constellation points 305 and 309 differ at bit $q_2$ and constellation points 305 and 311 differ at bit $i_1$.

In 16 QAM constellation 300, bits $i_1$ and $q_1$ are the most reliable bits, while bits $i_2$ and $q_2$ are the least reliable bits. Similarly, in a 64 QAM constellation with each constellation point representing 6 bits ($i_1 i_2 i_3 q_1 q_2 q_3$), bits $i_1$ and $q_1$ are the most reliable bits, bits $i_2$ and $q_2$ are the medium reliable bits, and bits $i_3$ and $q_3$ are the least reliable bits. In a 256 QAM constellation with each constellation point representing 8 bits ($i_1 i_2 i_3 i_4 q_1 q_2 q_3 q_4$), bits $i_1$ and $q_1$ are the most reliable bits, bits $i_2$ and $q_2$ are the first medium reliable bits, bits $i_3$ and $q_3$ are the second medium reliable bits, and bits $i_4$ and $q_4$ are the least reliable bits.

According to an example embodiment, the more reliable bits are scheduled for a STA with a lower SNR channel and the less reliable bits are scheduled for a STA with higher SNR channel. The assignment of the more reliable bits to the lower SNR channel increases the probability of successful decoding, while the assignment of less reliable bits to the higher SNR channel trades the probably of successful decoding for higher data rates.

Figure 3B:
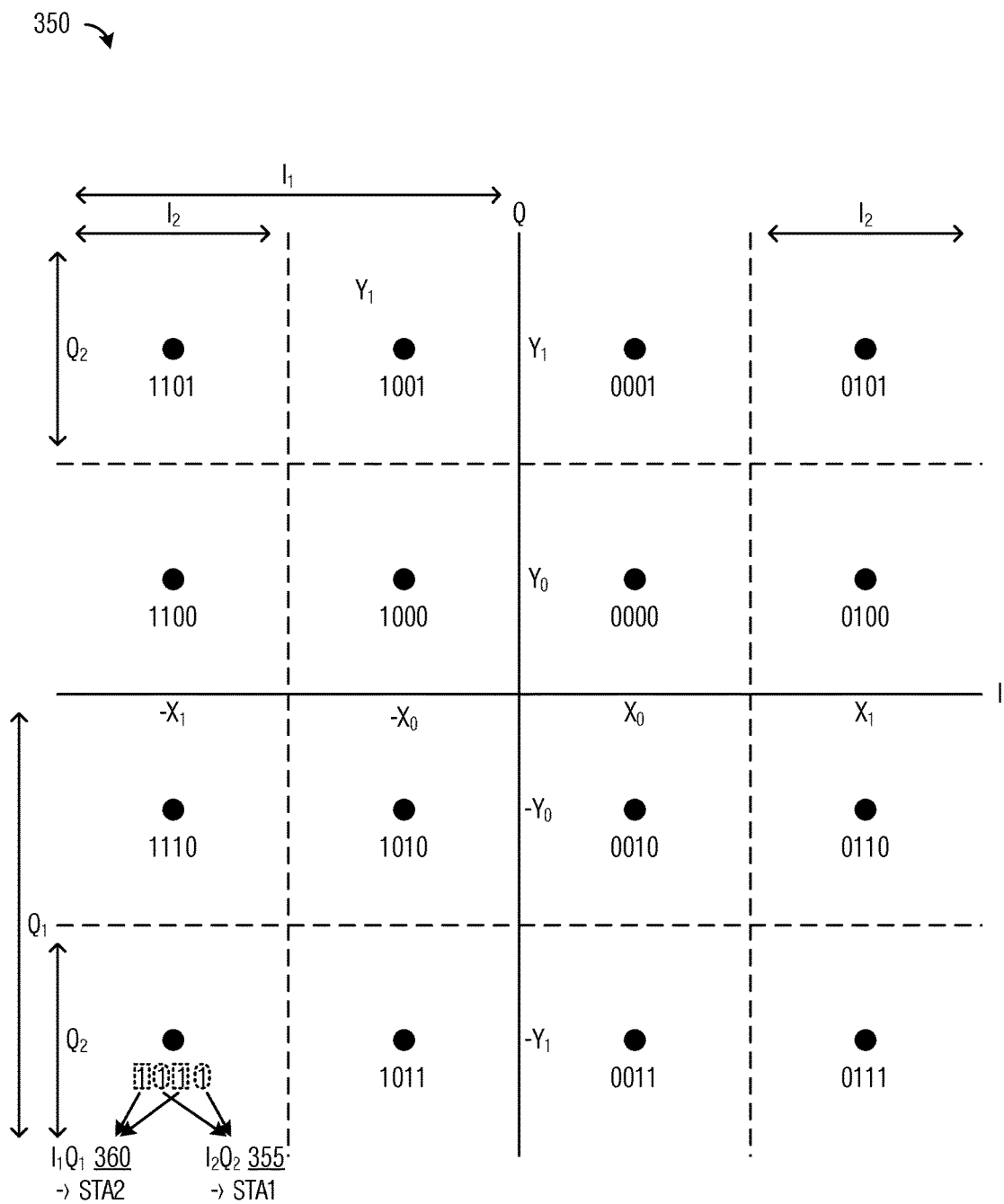
FIG. 3B illustrates an example semi-orthogonal multiple access (SOMA) constellation highlighting bit assignments according to example embodiments described herein.

FIG. 3B illustrates an example SOMA constellation 350 highlighting bit assignments. As shown in FIG. 3B, bits $i_2$ and $q_2$ 355 are assigned to STA1 and bits $i_1$ and $q_1$ 360 are assigned to STA2.

According to an example embodiment, power domain optimization (or similarly, power allocation) and MDMA are combined to produce a multiple access radio technology that offers improved capacity of communications channels and un-equal protection of data for different STAs. The combination is referred to as power and modulation division multiple access (PMDMA). Power domain optimization provides improved capacity of communications channels, while MDMA offers un-equal protection of data for different STAs. PMDMA decoding does not involve one STA having to decode the data of another STA. However, PMDMA allows the structure of interference from one STA to be used to improve the decoding performance at another STA. It is noted that PMDMA may also be referred to as semi-orthogonal multiple access (SOMA), since for some STAs (i.e., the high SNR STAs), the signal for the low SNR STAs may be considered as being no interference, and hence, orthogonal to the signal for the high SNR STAs. In the case of the low SNR STAs, the signal for the high SNR STAs is treated as interference to the signal for the low SNR STAs, and hence, non-orthogonal.

According to an example embodiment, the QAM constellation used in PMDMA is jointly mapped for STAs involved in the transmissions. The joint mapping of the QAM constellation for the STAs may enable STAs having high quality communications channels to decode signals intended for it without having to decode the signals intended for STAs with low quality communications channels. The signals intended for STAs with low quality communications channels may be considered to be orthogonal to the signals intended for STAs with high quality communications channels. Not having to decode signals intended for other STAs enable a reduction in processing complexity, as well as a reduction in signaling overhead.

Figure 3C:
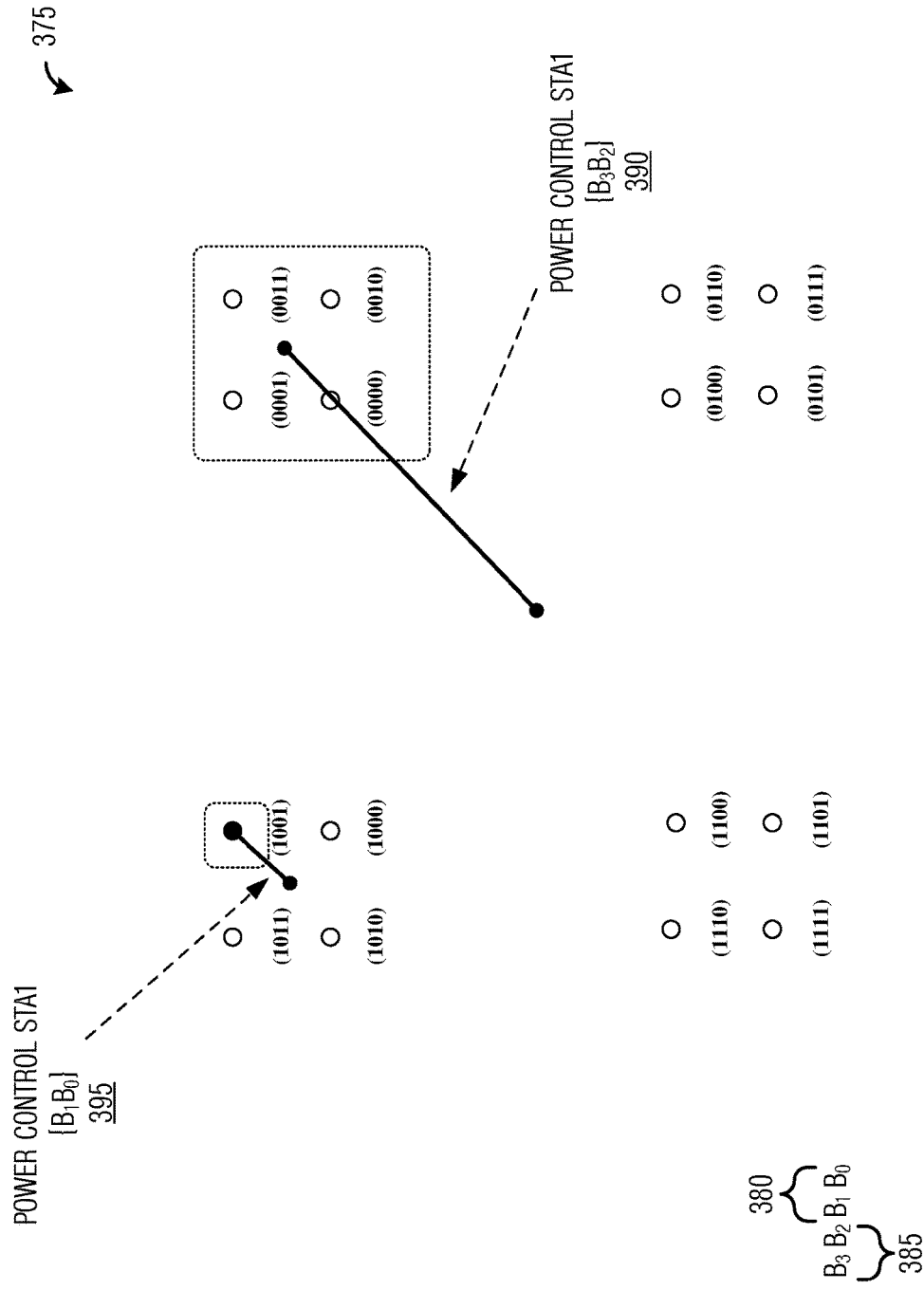
FIG. 3C illustrates an example power modulation division multiple access (PMDMA) (or SOMA) constellation according to example embodiments described herein.

FIG. 3C illustrates an example PMDMA (or SOMA) constellation 375. PMDMA constellation 375 is a 4-bit 16-QAM constellation. The 4 bits may be labeled $b_3 b_2 b_1 b_0$, with bits $b_1 b_0$ 380 being assigned to STA1 and bits $b_3 b_2$ 385 being assigned to STA2. For discussion purposes, consider a communications system as described in FIG. 2A, where STA1 and an AP share a high SNR communications channel and STA2 and the AP share a low SNR communications channel. Since the communications channel between STA1 and the AP is a high quality channel, a low reliability QAM layer (comprising bits $b_1 b_0$ 380) may be assigned to modulate data transmitted on the high quality communications channel since successful decoding probability is high and unneeded reliability is traded for higher data rates. A QAM layer comprises two bits of the corresponding Log-Likelihood Ratios (LLRs). Conversely, the communications channel between STA2 and the AP (or eNB) is a low quality channel. Hence, a high reliability QAM layer (comprising bits $b_3 b_2$ 385) may be assigned to modulate data transmitted on the low quality communications channel to trade-off data rate for improved decoding probability. The power control appears in PMDMA constellation 375 as a distance between an origin of a sub-constellation to a constellation point. For STA1, power control 390 may be based on an averaged power for the sub-constellation, with an origin for the sub-constellation being in the middle of the sub-constellation. For STA2, power control 395 may be based on an averaged power for the QAM constellation from an origin of the QAM constellation to the center of each sub-constellation. A ratio of the average power for the two STAs may be referred to as a power offset, Power_Offset=power_low_SNR_STA:
power_high_SNR_STA=power_STA2:
power_STA1, and is often expressed in dB.

Additional discussion of SOMA, SOMA constellations, and the like, is provided in depth in co-assigned US Patent Application entitled "System and Method for Semi-Orthogonal Multiple Access", application Ser. No. 14/589,676, filed Jan. 5, 2015, which is hereby incorporated herein by reference.

Figure 4A:
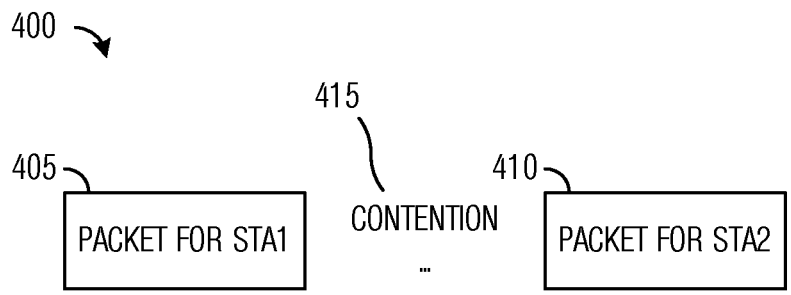
FIG. 4A illustrates a channel resource diagram for a WLAN using carrier sense multiple access (CSMA) according to example embodiments described herein.

FIG. 4A illustrates a channel resource diagram 400 for a WLAN using carrier sense multiple access (CSMA). In a communications system using CSMA, only transmissions to or from a single STA is permitted (such as packet for STA1 405) on a single channel or carrier. Furthermore, before another transmission to or from another STA is allowed to take place (such as packet for STA2 410), channel contention 415 must occur and the transmission to or from the other STA (e.g., packet for STA2 410) will only take place if the device making the transmission obtains access to the channel or carrier. The overhead incurred in channel contention 415 may reduce overall communications system performance.

Figure 4B:
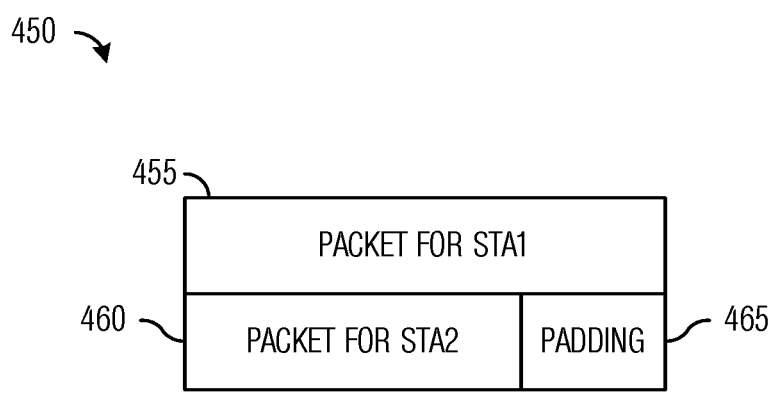
FIG. 4B illustrates a channel resource diagram for a WLAN using SOMA according to example embodiments described herein.

FIG. 4B illustrates a channel resource diagram 450 for a WLAN using SOMA. With SOMA, two or more STAs may be scheduled in a single channel or carrier. A shown in FIG. 4B, the single channel or carrier may carry a packet for STA1 455 as well as a packet for STA2 460. Padding 465 may be used if needed to match the size of packet for STA1 455 and packet for STA2 460. Although shown in FIG. 4B as supporting two transmissions, transmissions to two or more stations may be supported with an upper limit on the number of simultaneous transmissions being set by the size of the QAM constellation being used.

Generally, in SOMA the superposed constellation (i.e., the SOMA constellation) will be informed to the scheduled STAs (in WLAN systems or STA in 3GPP LTE systems) with exact bit locations (QAM level that each STA corresponds to) as well as power level which will indicate the power level of superposed constellation. The near STA (e.g., the high quality channel STA) may demodulate the received packet with the MCS of the superposed constellation and extracts the bits corresponding only to itself (the near STA). However, the far STA (e.g., the low quality channel STA) may demodulate the received packet in the MCS of superposed constellation and extracts the bits only corresponding to itself (the far STA), or it may demodulate the received packet in the actual MCS corresponding to the far STA, because the actual constellations corresponding to the near STA may be regarded as a noise by the far STA.

Usually, SOMA scheduling is available for multiple STAs when the STAs are under the same beam-forming (BF). Therefore, the signal to noise ratio (SNR) information of a channel is typically insufficient to schedule multiple STAs when SOMA is used. Furthermore, information about the BF is also needed to schedule the multiple STAs. The current IEEE 802.11 channel sounding protocol, which is originally designed for BF may be used to support SOMA scheduling. It is noted that when BF is not being used, the channel SNR information of each STA may be sufficient to select STAs for SOMA scheduling.

According to an example embodiment, the information needed for SOMA scheduling is signaled to scheduled STAs. As an example, a SIG field in a preamble portion of a physical layer header of next generation WLAN systems is a suitable place for such signaling. However, the SIG field is not the only possible location for the signaling. The signaling may also be included in a media access control (MAC) header.

According to an example embodiment, SOMA group identifier (GID) based control signaling is used to apply SOMA in WLAN systems. GID is a mechanism in which multiple STAs may be identified using a reduced number of bits. In WLAN systems, STAs are normally identified globally by their MAC address (usually 6 bytes long) or locally by an association identifier (AID) assigned to them by an association access point. The AID is usually two bytes long. Using either the MAC address or the AID for STA identification may result in high system overhead. STAs may be placed into SOMA groups that are identified by a GID. The GID may be a few bits in length, which can significantly reduce system overhead when it comes to STA identification. GID may also be used to identify multi-user (MU) groups for downlink MU transmission, as well as for orthogonal frequency division multiple access (OFDMA) resource allocation where the number of streams for MU-MIMO are combined together.

According to an example embodiment, a SOMA GID (S-GID) is used to identify those STAs participating in a SOMA transmission. The S-GID may be used to support STA grouping (e.g., high SNR STAs and low SNR STAs, high SNR, medium SNR, and low SNR STAs, and the like). In addition to STA identification information, SOMA signaling may also include (but not necessarily limited to):

Which bits in a constellation belongs to which STA;
The MCS used for each STA (or superposed MCS for all SOMA scheduled STAs; and
The power offset for each STA (useful for PMDMA).

Since SOMA scheduling may be performed on top of OFDMA scheduling, it may be possible to replace a number of space-time streams (NSTS) field with SOMA signaling. Details of the NSTS field and its use are provided in co-assigned US Provisional Patent Application entitled "System and Method for a Preamble Supporting OFDMA Mapping", Application No. 61/991,024, filed May 9, 2014, which is hereby incorporated herein by reference. Additionally, since there are multiple variants of SOMA (e.g., MDMA and PMDMA are classified as SOMA), control signaling for the different variants of SOMA may be used. As an example, a one or two bit indicator (or as many bits as are needed) of SOMA scheduling in a corresponding resource unit is used.

In the case of MDMA, only the QAM level and MCS (whether it may be the superposed MCS or individual MCS of scheduled STAs) may be necessary for the scheduled STAs. In the SIG field of a SOMA scheduled OFDMA PPDU, a resource allocation using the GID as presented in incorporated U.S. Provisional Patent Application No. 61/991,024 may be used. Differences include replacement of the NSTS with the MCS of each SOMA scheduled STA. The position of the MCS of each SOMA scheduled STA in the SIG field may be determined by the GID management frame. Therefore, the QAM level may also be determined by the STA position information in the group identifier of the GID management frame.

Figures 5, 12:
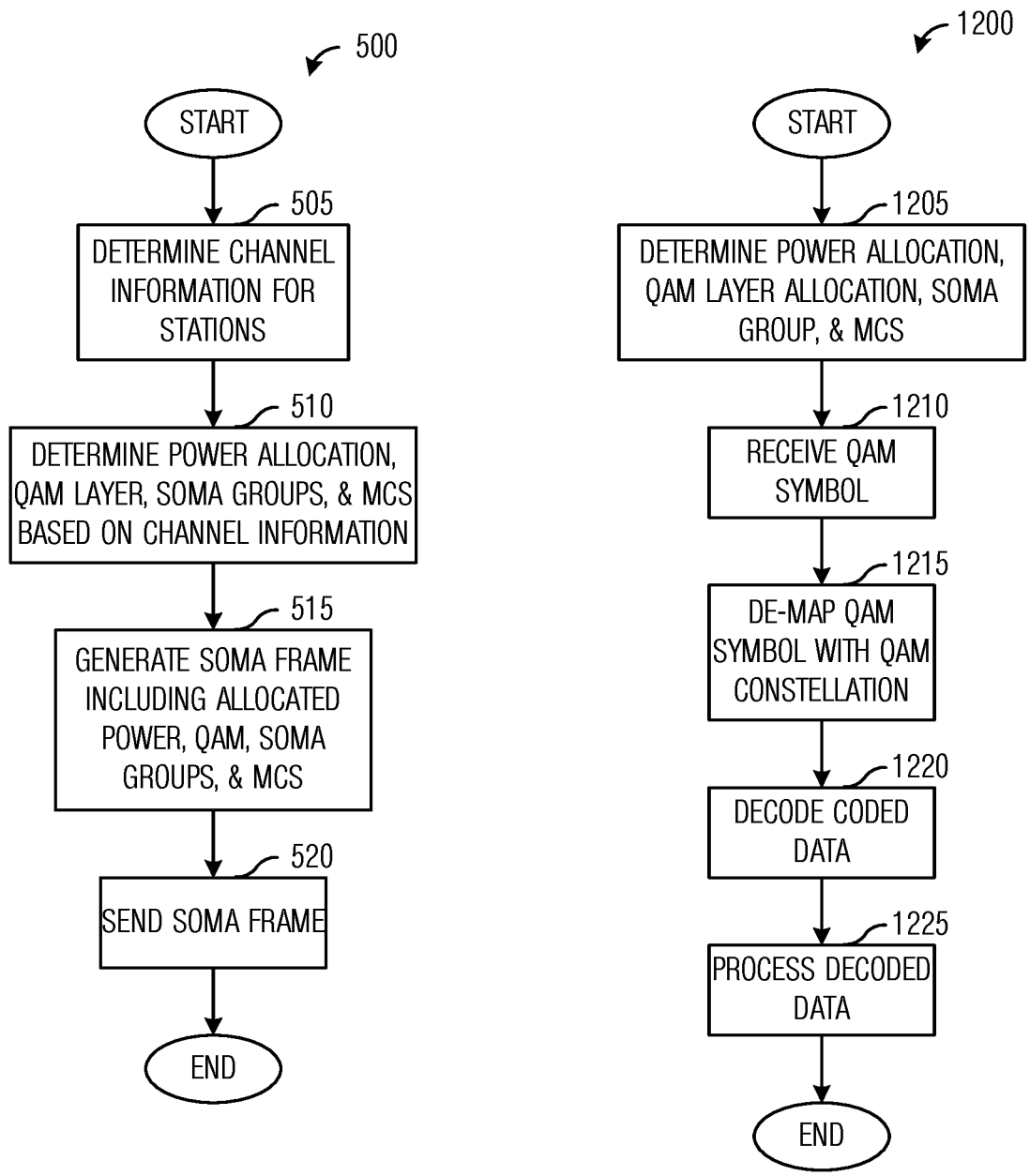
FIG. 5 illustrates a flow diagram of example operations occurring in a transmitting device signaling SOMA configuration information according to example embodiments described herein.
FIG. 12 illustrates a flow diagram of example operations occurring in a receiving device as the receiving device receives and processes data transmitted using SOMA according to example embodiments described herein.

FIG. 5 illustrates a flow diagram of example operations 500 occurring in a transmitting device signaling SOMA configuration information. Operations 500 may be indicative of operations occurring in a transmitting device, such as an AP, as the transmitting device signals SOMA configuration information to STAs served by the transmitting device.

Operations 500 begin with the AP determining channel information for the STAs (block 505). The channel information may be received from the STAs. The channel information may be in the form of CQI, CSI, or other information related to channel quality, channel condition, and the like. The AP determines a power allocation, QAM layer allocation, SOMA groups, MCS level, and the like, for a plurality of STAs in accordance with the channel information associated with the plurality of STAs (block 510). As an illustrative example, the AP may select a STA with a high quality channel (such as STA1 of FIG. 2A) and a STA with a low quality channel (such as STA2 of FIG. 2A) and determine a power allocation and a QAM layer allocation for each of the STAs. Alternatively, the AP may select more than 2 STAs. The AP may determine a coding rate for the subset of the STAs reporting channel information.

The AP generates a SOMA frame (block 515). The SOMA frame may include information about power allocations, QAM layer allocations, S-GIDs, MCS level, and so on, for each SOMA group. Detailed discussions of different example formats of SOMA frames are provided below. The AP sends the SOMA frame (block 520).

According to an example embodiment, the STA position information in the SOMA GID management frame indicates the sequence of the most reliable bits, medium reliable bits, and so on, to the least reliable bits which correspond to the QAM levels. As an illustrative example, a first STA in the group may be assigned the most reliable bits, the second STA in the group may be assigned the medium reliable bits, and the like. The sequence from the most to the least reliable bits may be arbitrarily changed, and may be implementation specific.

Figure 6:
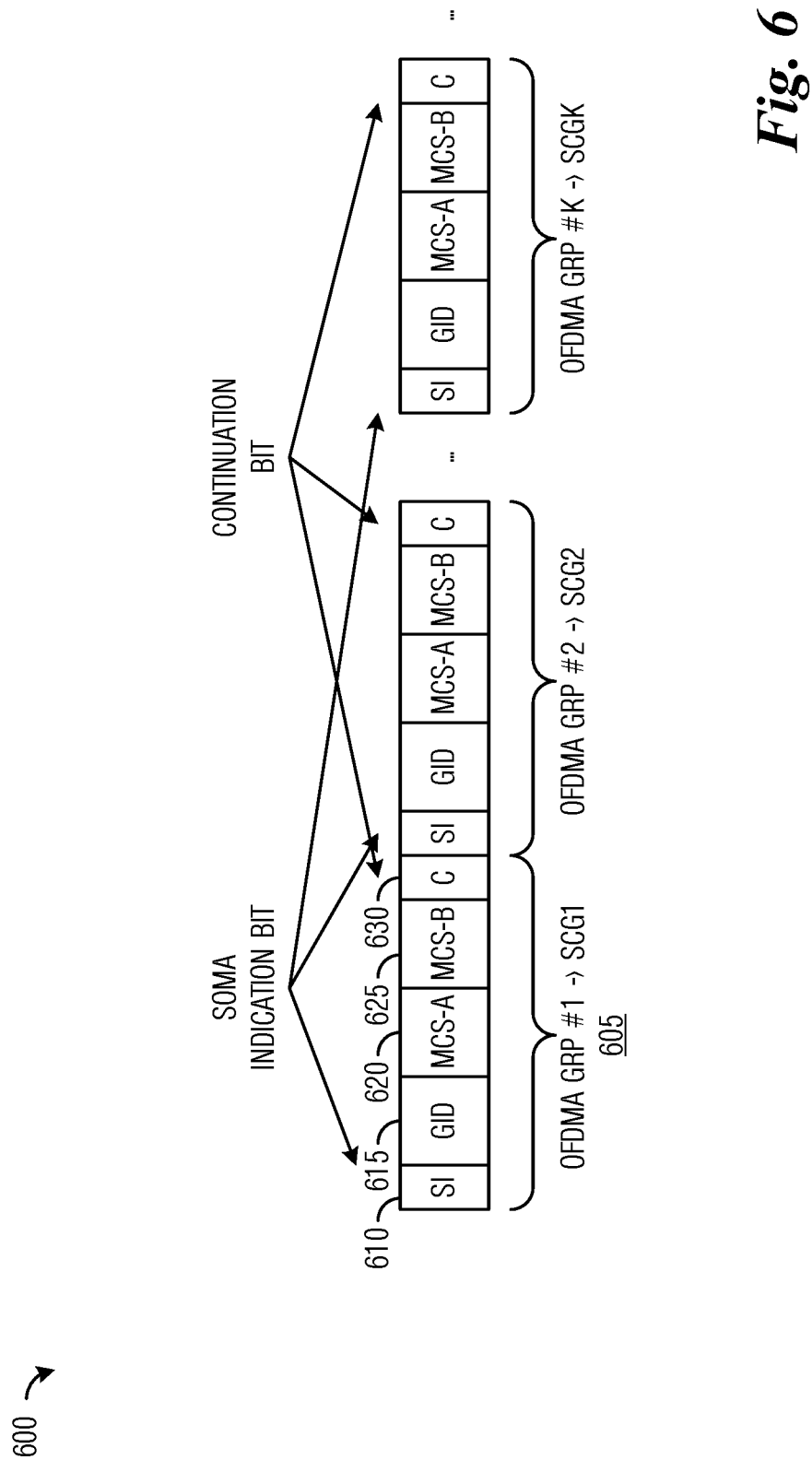
FIG. 6 illustrates a first example format of a SOMA frame according to example embodiments described herein.

FIG. 6 illustrates a first example format of a SOMA frame 600. SOMA frame 600 includes SOMA information for one or more SOMA groups. The following is a discussion of SOMA information for SOMA group 1605, but the format of the SOMA information for other SOMA groups are the same. For SOMA group 1605, the SOMA information includes:

a SOMA indication (SI) bit 610 indicating that the frame is a SOMA frame, to differentiate it from a GID frame, for example.

a GID field 615 that is N bits long, where N is an integer value (example values for N include 8, 9, 10, 11, and the like). The value in the GID field uniquely identifies OFDMA and/or SOMA groups of M STAs, where M is an integer value (example values for M include 2, 3, 4, 5, and the like). Non-unique identification of some SOMA groups is also possible, and may lead to overloading of available GID space. In such a situation, STAs may rely on other identifiers, such as MAC headers, to resolve ambiguities.

Fields MCS-A 620, MCS-B 625, and the like (which depends on the number of scheduled SOMA STAs) of SOMA frame 600, represent the MCS of each scheduled SOMA STA. As an example, MCS-A 620 represents the MCS for STA A, MCS-B 625 represents the MCS for STA B, and the like. A limit on the number of scheduled SOMA STAs may be M, while practical limitations may limit M to 4 in the case of superposed constellations, e.g., 256 QAM constellation. A MCS for a single scheduled SOMA STA may also be limited. As an example, a MCS may be limited to 3 bits because a 64 QAM may be the largest constellation that each scheduled SOMA STA may be assigned.

A continuation (C) bit 630 may be added to indicate the end of the allocated groups. SOMA frame 600 may continue for additional SOMA groups.

Each allocated group may be assigned to one or more sub-carrier groups (SCG). A SCG may also be referred to as a resource unit or sub-channel group. As shown in FIG. 6, an implicit SCG index is used so that SCG 1 is assigned to a first group, SCG 2 is assigned to a second group, and the like. In another example embodiment, the SCG index may be explicitly included in the SIG field. Explicitly assigning the SCG to a group may result in increased overhead that is dependent upon the number of SCGs that can be allocated.

Figure 7:
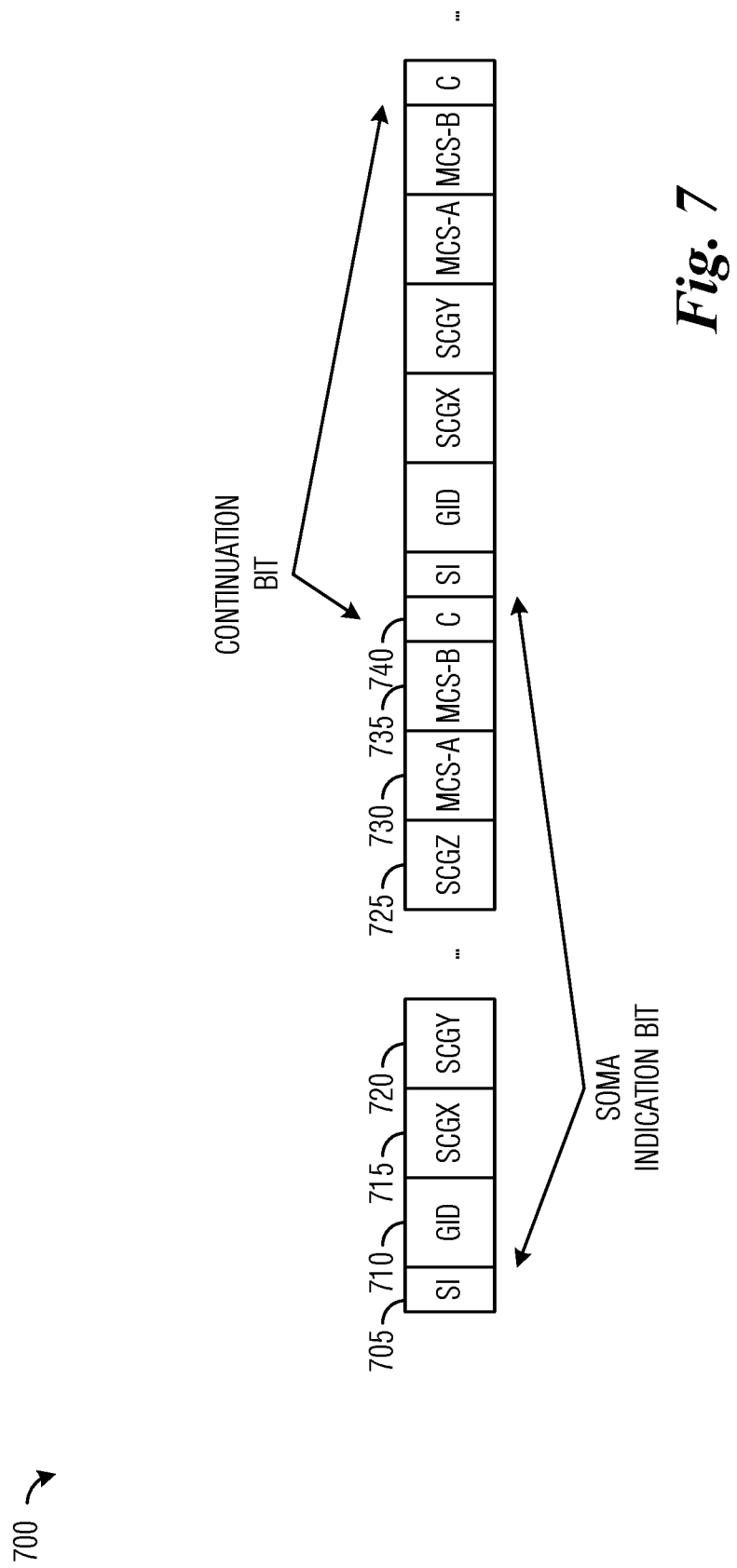
FIG. 7 illustrates a second example format of a SOMA frame according to example embodiments described herein.

FIG. 7 illustrates a second example format of a SOMA frame 700. SOMA frame 700 highlights the situation where the SCG index is explicitly specified in the signaling, i.e., SCG fields including SCGX 715, SCGY 720, and SCGZ 725. SOMA frame 700 also highlights a situation where more than one SCG is allocated to a group, e.g., SCGX 715, SCGY 720, and SCGZ 725 begin allocated to SOMA group GID 710. MCS-A 730 and MCS-B 735 represents the MCS for STA A and STA B, respectively. It is noted that a SOMA indication bit 705 (shown in FIG. 7) may not be needed if a single GID space is used with some of the GID values are allocated to S-GID use. Continuation (C) bit 740 may be added to indicate the end of the allocated groups. SOMA frame 700 may continue for additional SOMA groups.

According to an example embodiment, a power offset is also signaled in the SOMA frame. When PMDMA is used, the power offset, in addition to the information signaled for MDMA, is signaled. The adaptive power allocation for scheduled SOMA STAs may depend upon the power division level. As an illustrative example, in a two STA situation, if one STA is scheduled with $3/4$ of the total transmit power, the other scheduled STA may be allocated with $1/4$ of the transmit power. In a similar situation, $4/5$ and $1/5$ power allocations are possible as, are $3/5$ and $2/5$ power allocations, and the like. In a situation where more than two STAs are scheduled together, three power level allocations are needed. In consideration of all of these factors, the following power levels may be available: $5/6$, $4/6$, $3/6$, $2/6$, $1/6$, $4/5$, $3/5$, $2/5$, $1/5$, $3/4$, $2/4$, $1/4$, and the like, depending on the power allocation. It may be possible to quantize the available power levels and indicate the quantized power levels in the SIG field together with SOMA GID based scheduling allocations. As an illustrative example, consider a situation where the following power levels are available $4/5$, $3/5$, $2/5$, $1/5$, $3/4$, $2/4$, and $1/4$, then there are 7 power levels. Therefore, 3 bits is sufficient to indicate the power level.

Figure 8:
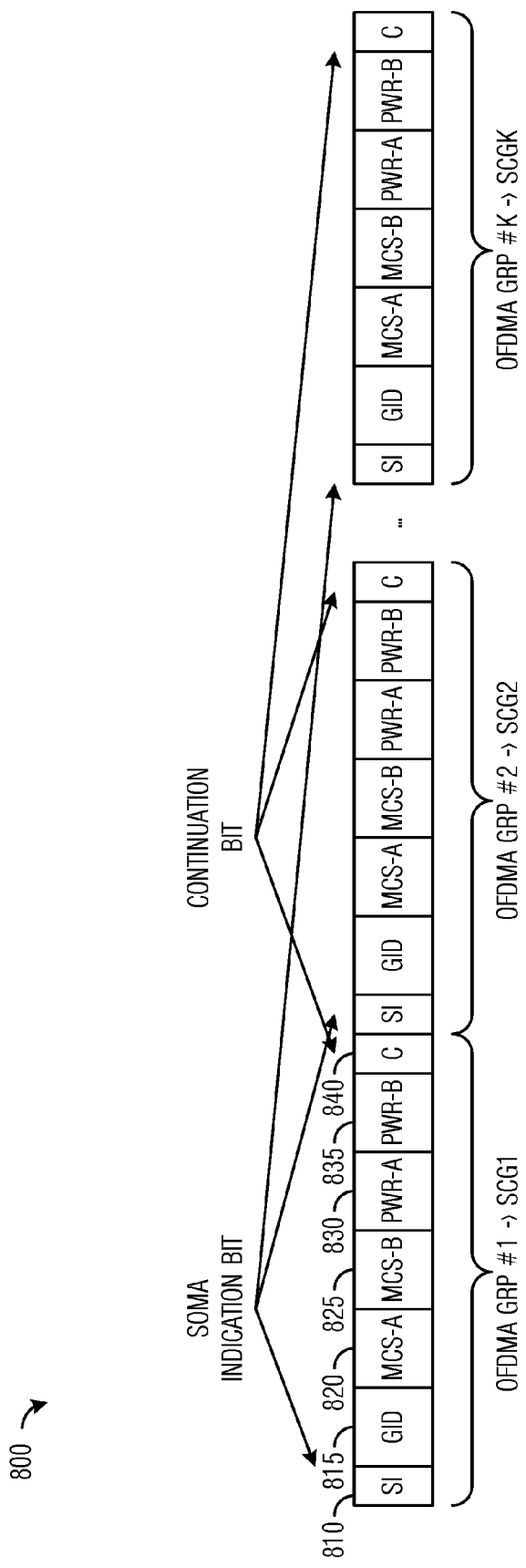
FIG. 8 illustrates a third example format of a SOMA frame according to example embodiments described herein.

FIG. 8 illustrates a third example format of a SOMA frame 800. SOMA frame 800 is similar to SOMA frame 600 in that it is individual MCS based. SOMA frame Boo includes, for each SOMA group, power offset information for each scheduled SOMA STA (e.g., PWR-A, PWR-B, and so on, fields). As an example, for SOMA group 1805, SOMA frame 800 includes a SI bit 810, a GID field 815, MCS fields for STA of SOMA group 1 (e.g., MCS-A 820 and MCS-B 825), as well as power offset information for STAs of SOMA group 1 (e.g., PWR-A 830 and PWR-B 835), and a C bit 840 to indicate the end of the allocated groups. Since the total power needs to add up to 1, the number of power offset information fields for a group may be one fewer than the number MCS fields for the same group, although in FIG. 8, the number of MCS fields and power offset information fields is equal. As an example, as shown in FIG. 8, some groups include two scheduled SOMA STAs. Therefore, two MCS fields are needed, but only one power offset information field is needed since if one power offset information field (e.g., PWR-A) corresponds to STA A, then the power offset for STA B is implicitly 1-PWR-A. Therefore, signaling the power offset information field for STA B is unnecessary. SOMA frame 800 uses an implicit SCG index, so SCG 1 is assigned to the first group, SCG 2 is assigned to the second group, and the like. Explicit SCG index may also be used. With explicit SCG indexing, a variation of SOMA frame 700 of FIG. 7 may be used and adding power offset information fields for the various scheduled SOMA STAs.

Figure 9:
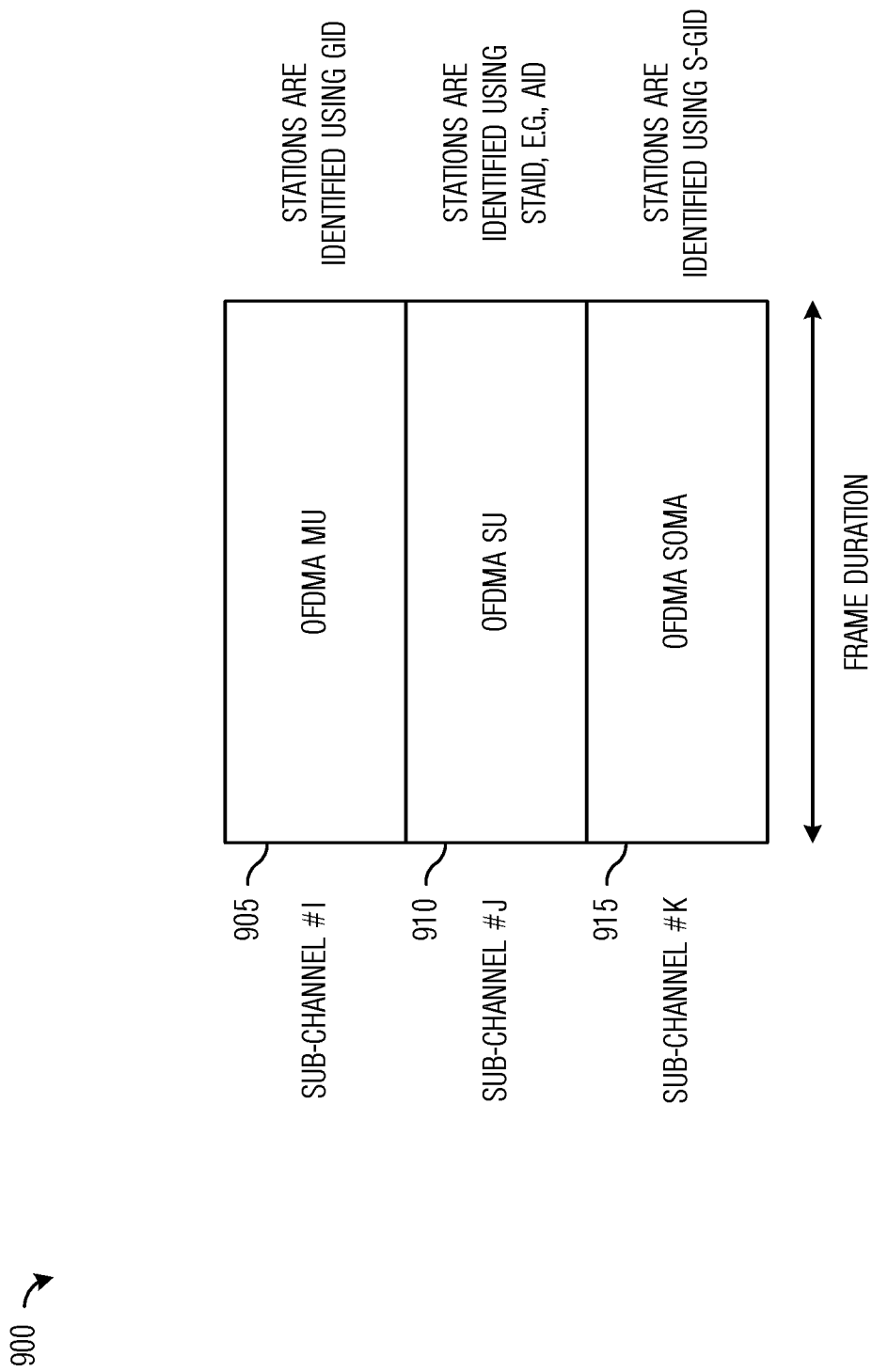
FIG. 9 illustrates an example sub-channel allocation according to example embodiments described herein.

FIG. 9 illustrates an example sub-channel allocation 900. Sub-channel allocation 900 may specify an allocation of spectrum to different STAs. Sub-channel #i 905 may be allocated for OFDMA MU usage and assigned for use by STAs that are identified based on their GID. Sub-channel #j 910 may be allocated for OFDMA SU usage and assigned for use by STAs that are identified based on their STA identifier, such as their AID, while sub-channel #k 915 may be allocated for OFDMA SOMA usage and assigned for use by STAs that are identified by the S-GID.

According to an example embodiment, managing S-GIDs is achieved using GID management frames, such as those presented in IEEE 802.11ac, where STAs are assigned to different groups and the position of a STA in a group is determined. S-GID may be drawn from a separate GID space (separate from the GID used for OFDMA MU, for example). Alternatively, S-GID may share the same GID space with OFDMA MU. In such a situation, the GID space may be divided between the two types of GID (S-GID and OFDMA MU GID). As an illustrative example, GIDs from 0 to 15 may be used for S-GID and GIDs greater than 15 may be used for OFDMA MU.

As discussed previously, MAC address or AID may be used for STA identification at the expense of increased overhead. However, STA identification using a global identifier may be used for SOMA signaling. In such a situation, SOMA signaling may include the following fields:

SOMA/SU/MU—indicating the type of transmission;
STA AID—identifying the STA;
SCG index—identifying the sub-channel;
Bit allocation—identifying which reliability bits are assigned to the STA (e.g., High/Medium/Low, High/Low, and the like);
MCS—identifying the MCS and constellation allocated to the STA; and
PWR—identifying the power offset information for the STA.

Figure 10:
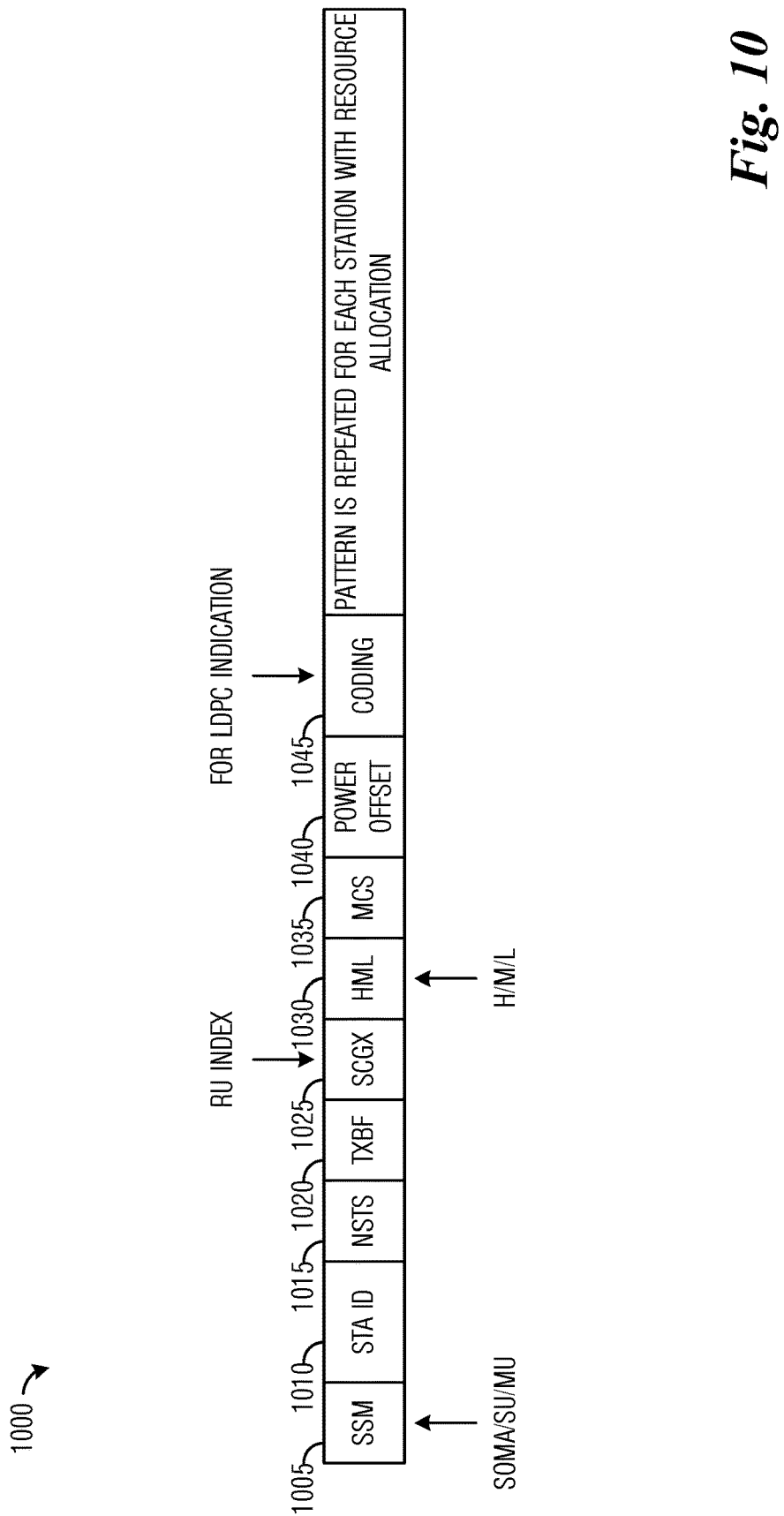
FIG. 10 illustrates a first example format of a SOMA frame highlighting global identifier based SOMA signaling according to example embodiments described herein.

FIG. 10 illustrates a first example format of a SOMA frame 1000 highlighting global identifier based SOMA signaling. The fields in SOMA frame 1000 include a SOMA/SU/MU (SSM) field 1005 including an indicator of the type of transmission, a STA ID field 1010 identifying the STA, an NSTS field 1015 indicating a number of spatial streams, a TXBF field 1020 indicating if transmit beamforming is used, a SCGX field 1025 indicating a sub-carrier group used, a High/Medium/Low (HML) field 1030 indicating which reliability bits assigned to the STA, a MCS field 1035 indicating the MCS and constellation allocated to the STA or a superposed MCS and constellation for the SOMA scheduled STAs, a POWER OFFSET field 1040 indicating power offset information for the STA, and a CODING field 1045 indicating usage of a low density parity check (LDPC) code. The fields may be repeated for each STA with a SOMA resource allocation.

According to an example embodiment, SOMA information is signaled in a high-efficiency signal B (HE-SIGB) field. In the IEEE 802.11ax technical standards, a packet preamble includes two HE-SIGB fields, a first HE-SIGB field that is a common subfield that includes information for all STAs and a second HE-SIGB field that is a STA specific subfield that includes information for a specific STA or group of STAs. The SOMA information may be signaled in the STA specific subfield. The SOMA information utilize the format used in signaling SU-MIMO information, with STA ID, NSTS, and TXBF being information common to both SU-MIMO and SOMA. However, a SI indicator is used to differentiate SOMA information from SU-MIMO information. Therefore, if the SI indicator is a first value (e.g., 1), then SOMA is being used, and if the SI indicator is a second value (e.g., 0), then SU-MIMO is being used.

Figure 11:
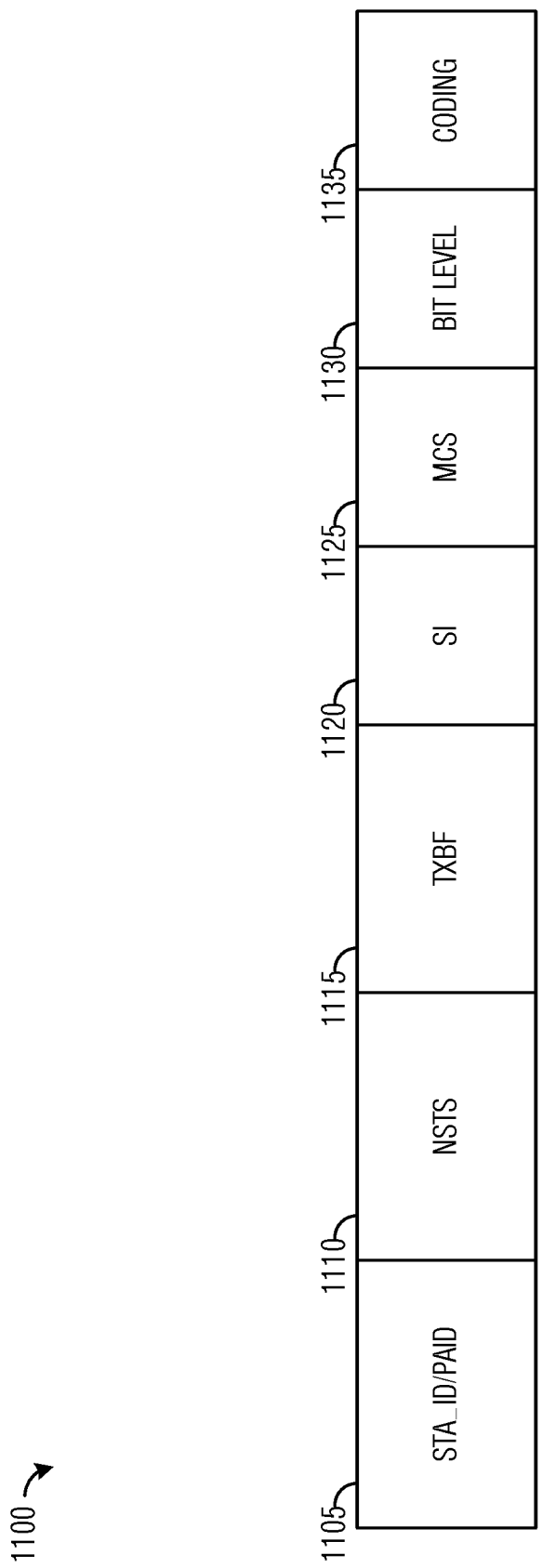
FIG. 11 illustrates a second example format of a SOMA frame highlighting global identifier based SOMA signaling according to example embodiments described herein.

FIG. 11 illustrates a second example format of a SOMA frame 1100 highlighting global identifier based SOMA signaling. The fields in SOMA frame 1100 include a STA ID field 1105 identifying the STA, an NSTS field 1110 indicating a number of spatial streams, a TXBF field 1115 indicating if transmit beamforming is used, a SI field 1120 indicating the use of SOMA or SU-MIMO, a MCS field 1125 indicating the MCS and constellation allocated to the SOMA scheduled STA(s), a bit level field 1130 indicating which bits corresponds to which STA, and a coding field 1135 indicating LDPC usage.

STA ID field 1105, NSTS field 1110, and TXBF field 1115 may share information common for both SU-MIMO and SOMA. SI field 1120 differentiates SOMA from SU-MIMO. If SI field 1120 indicates SOMA (e.g., if SI field 1120 contains a 1), the contents of MCS field 1125 represents the MCS for all SOMA scheduled STAs and the contents of bit level field 1130 represents which bits correspond to which SOMA scheduled STA. If SI field 1120 indicates SU-MIMO (e.g., if SI field contains a 0), the contents of MCS field 1125 represents the MCS of scheduled STA and the contents of bit level field 1130 indicates some other information and the contents of coding field 1135 indicates LDPC usage.

FIG. 12 illustrates a flow diagram of example operations 1200 occurring in a receiving device as the receiving device receives and processes data transmitted using SOMA. Operations 1200 may be indicative of operations occurring in a receiving device, such as a STA, as the receiving device receives and processes data transmitted using SOMA.

Operations 1200 begin with the STA determining a power allocation, a QAM constellation, QAM layer allocation, SOMA groups, MCS level, and the like (block 1205). The STA may determine the power allocation, QAM constellation, QAM layer allocation, SOMA groups, MCS level, and the like, from a SOMA frame received by the STA. The STA may determine the information in accordance with its SOMA group membership. The STA receives a QAM symbol (block 1210). The STA de-maps the QAM symbol using the QAM constellation, producing encoded data (block 1215). The STA decodes the encoded data (block 1220). The STA processes the decoded data (block 1225).

Figure 13:
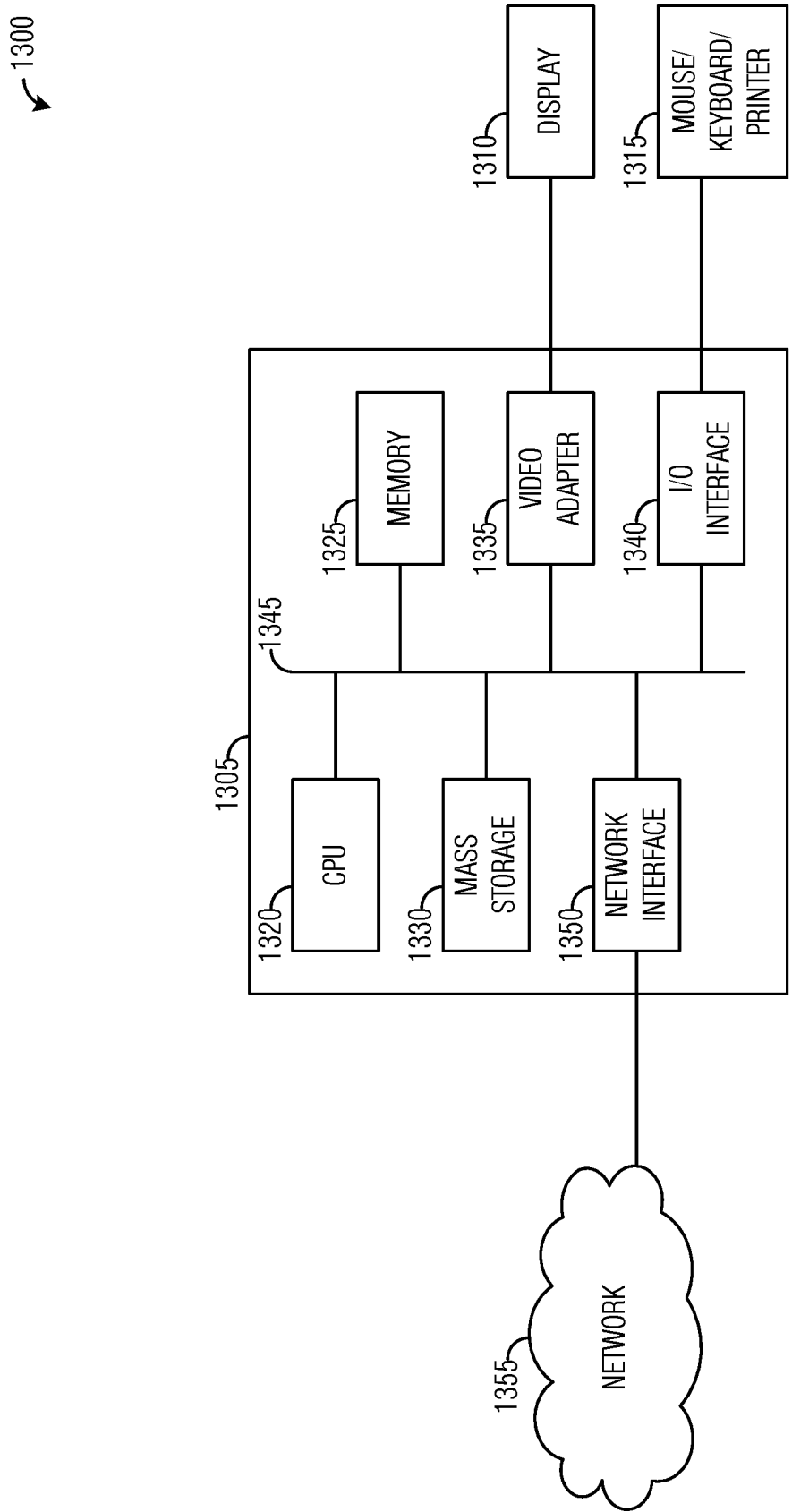
FIG. 13 is a block diagram of a processing system that may be used for implementing the devices and methods disclosed herein.

FIG. 13 is a block diagram of a processing system 1300 that may be used for implementing the devices and methods disclosed herein. In some embodiments, the processing system 1300 comprises a UE. In other embodiments, the processing system 1300 comprises a network controller. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1305 equipped with one or more input/output devices, such as a human interface 1315 (including speaker, microphone, mouse, touchscreen, keypad, keyboard, printer, and the like), display 1310, and so on. The processing unit may include a central processing unit (CPU) 1320, memory 1325, a mass storage device 1330, a video adapter 1335, and an I/O interface 1340 connected to a bus 1345.

The bus 1345 may be one or more of any type of several bus architectures including a memory bus or memory controller, a peripheral bus, video bus, or the like. The CPU 1320 may comprise any type of electronic data processor. The memory 1325 may comprise any type of system memory such as static random access memory (SRAM), dynamic random access memory (DRAM), synchronous DRAM (SDRAM), read-only memory (ROM), a combination thereof, or the like. In an embodiment, the memory 1325 may include ROM for use at boot-up, and DRAM for program and data storage for use while executing programs.

The mass storage device 1330 may comprise any type of storage device configured to store data, programs, and other information and to make the data, programs, and other information accessible via the bus 1345. The mass storage device 1330 may comprise, for example, one or more of a solid state drive, hard disk drive, a magnetic disk drive, an optical disk drive, or the like.

The video adapter 1335 and the I/O interface 1340 provide interfaces to couple external input and output devices to the processing unit 1305. As illustrated, examples of input and output devices include the display 1310 coupled to the video adapter 1335 and the mouse/keyboard/printer 1315 coupled to the I/O interface 1340. Other devices may be coupled to the processing unit 1305, and additional or fewer interface devices may be utilized. For example, a serial interface such as Universal Serial Bus (USB) (not shown) may be used to provide an interface for a printer.

The processing unit 1305 also includes one or more network interfaces 1350, which may comprise wired links, such as an Ethernet cable or the like, and/or wireless links to access nodes or different networks 1355. The network interface 1350 allows the processing unit 1305 to communicate with remote units via the networks 1355. For example, the network interface 1350 may provide wireless communication via one or more transmitters/transmit antennas and one or more receivers/receive antennas. In an embodiment, the processing unit 1305 is coupled to a local-area network or a wide-area network 1355 for data processing and communications with remote devices, such as other processing units, the Internet, remote storage facilities, or the like.

Figure 14:
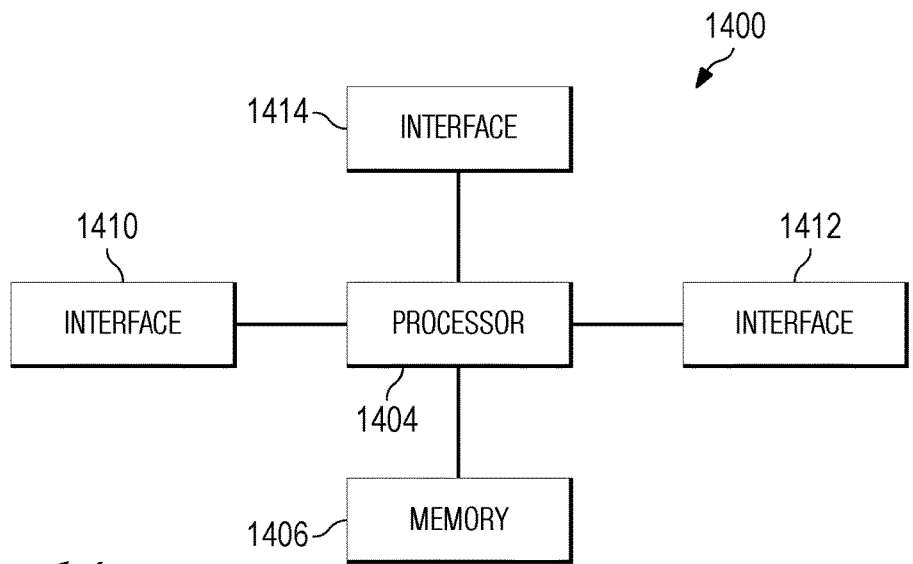
FIG. 14 illustrates a block diagram of an embodiment processing system 1400 for performing methods described herein.

FIG. 14 illustrates a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 606 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 1404 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 15:
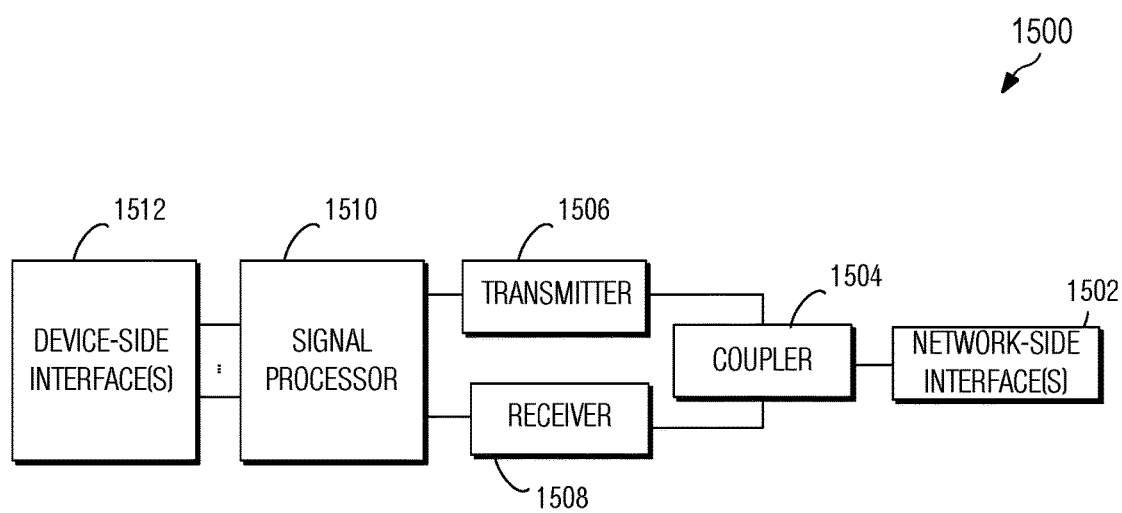
FIG. 15 illustrates a block diagram of a transceiver 1500 adapted to transmit and receive signaling over a telecommunications network according to example embodiments described herein.

In some embodiments, one or more of the interfaces 1410, 1412, 1414 connects the processing system 1400 to a transceiver adapted to transmit and receive signaling over the telecommunications network. FIG. 15 illustrates a block diagram of a transceiver 1500 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 600, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmitting device using semi-orthogonal multiple access (SOMA) in a wireless local area network (WLAN), the method comprising:
generating, by the transmitting device, a frame including indicators, in accordance with channel information associated with a first receiving device and a second receiving device, of first and second quadrature amplitude modulation (QAM) bit allocations, first and second coding rates, and first and second SOMA groups, the generating the frame comprising, for each of the first and second SOMA groups:
populating a respective station identifier field with a station identifier for each receiving device associated with the SOMA group, and
populating a respective modulation and coding scheme (MCS) field with a modulation and coding rate indicator for each receiving device associated with the SOMA group; and
sending, by the transmitting device, the frame to the first receiving device and the second receiving device.

2. The method of claim 1, the generating the frame further comprising populating a SOMA indication (SI) field with a SI indicator.

3. The method of claim 2, the generating the frame further comprising populating the frame with an indicator of a first power allocation for the first receiving device and a second power allocation for the second receiving device.

4. The method of claim 3, the indicator in accordance with the channel information associated with the first receiving device and the second receiving device.

5. The method of claim 4, the generating the frame further comprising populating subcarrier group fields with at least one sub-channel index indicator for each SOMA group.

6. The method of claim 2, the generating the frame further comprising:
populating a number of spatial streams (NSTS) field with an NSTS indicator indicating a number of spatial streams used to transmit the frame; and
populating a bit level field with indicators of QAM bits associated with the first receiving device and the second receiving device.

7. The method of claim 6, the sending the frame further comprising sending the frame in a high efficiency signal B (HE-SIGB) portion of a packet preamble.

8. The method of claim 1, the generating the frame further comprising populating subcarrier group fields with at least one sub-channel index indicator for each SOMA group.

9. A method for operating a first receiving device operating in a semi-orthogonal multiple access (SOMA) wireless local area network (WLAN), the method comprising:
receiving a frame, by the first receiving device, having a first quadrature amplitude modulation (QAM) bit allocation, a first coding rate, and a first SOMA group for the first receiving device and a second QAM bit allocation, a second coding rate, and a second SOMA group for a second receiving device in accordance with a frame, the frame comprising, for each of the first SOMA group and the second SOMA group:
a respective station identifier field with a station identifier for each receiving device associated with the SOMA group, and
a respective modulation and coding scheme (MCS) field with a modulation and coding rate indicator for each receiving device associated with the SOMA group;
receiving, by the first receiving device, a QAM symbol;
demapping, by the first receiving device, the QAM symbol in accordance with the first and second QAM bit allocations, thereby producing encoded data;
decoding, by the first receiving device, the encoded data in accordance with the first and second coding rates, thereby producing decoded data; and
processing, by the first receiving device, the decoded data.

10. The method of claim 9, the frame further comprising:
a SOMA indication (SI) field with a SI indicator.

11. The method of claim 10, the frame further comprising:
an indicator of a first power allocation for the first receiving device and a second power allocation for the second receiving device.

12. The method of claim 11, the frame further comprising:
subcarrier group fields with at least one sub-channel index indicator for each SOMA group.

13. The method of claim 10, the frame further comprising:
a number of spatial streams (NSTS) field with an NSTS indicator indicating a number of spatial streams used to transmit the frame; and
a bit level field with indicators of QAM bits associated with the first receiving device and the second receiving device.

14. A transmitting device comprising:
a non-transitory memory storage comprising instructions; and
one or more processors in communication with the non-transitory memory storage, wherein the one or more processors execute the instructions to:
generate a frame including indicators, in accordance with channel information associated with a first receiving device and a second receiving device, of first and second quadrature amplitude modulation (QAM) bit allocations, first and second coding rates, and first and second SOMA groups, wherein the one or more processors executing the instructions to generate the frame comprises, for each of the first and second SOMA groups, the one or more processors executing the instructions to:
populate a respective station identifier field with a station identifier for each receiving device associated with the SOMA group, and
populate a respective modulation and coding scheme (MCS) field with a modulation and coding rate indicator for each receiving device associated with the SOMA group; and
send the frame to the first receiving device and the second receiving device.

15. The transmitting device of claim 14, wherein the one or more processors execute the instructions to populate a SOMA indication (SI) field of the frame with a SI indicator.

16. The transmitting device of claim 15, wherein the one or more processors execute the instructions to populate the frame with an indicator of a first power allocation for the first receiving device and a second power allocation for the second receiving device.

17. The transmitting device of claim 16, wherein the one or more processors execute the instructions to populate subcarrier group fields of the frame with at least one sub-channel index indicator for each SOMA group.

18. The transmitting device of claim 15, wherein the one or more processors execute the instructions to populate a number of spatial streams (NSTS) field of the frame with an NSTS indicator indicating a number of spatial streams used to transmit the frame, and populate a bit level field of the frame with indicators of QAM bits associated with the first receiving device and the second receiving device.

19. The transmitting device of claim 18, wherein the one or more processors executing the instructions to send the frame further comprises the one or more processors executing the instructions to send the frame in a high efficiency signal B (HE-SIGB) portion of a packet preamble.

20. The transmitting device of claim 14, wherein the one or more processors executing the instructions to generate the frame further comprises the one or more processors executing the instructions to populate subcarrier group fields with at least one sub-channel index indicator for each SOMA group.

* * * * *